US012679404B2

(12) United States Patent
Fox et al.

(10) Patent No.: US 12,679,404 B2
(45) Date of Patent: Jul. 14, 2026

(54) AUTONOMOUS DRIVING ROAD SPACE RESERVATION AND ADAPTION

(71) Applicant: International Business Machines Corporation, Armonk, NY (US)

(72) Inventors: Jeremy R. Fox, Georgetown, TX (US); Vinod A. Valecha, Pune (IN); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 18/499,626

(22) Filed: Nov. 1, 2023

(65) Prior Publication Data

US 2025/0136145 A1 May 1, 2025

(51) Int. Cl.
| *H04W 4/46* | (2018.01) |
| *B60W 40/12* | (2012.01) |
| *B60W 60/00* | (2020.01) |

(52) U.S. Cl.
CPC .......... *B60W 60/001* (2020.02); *B60W 40/12* (2013.01); *H04W 4/46* (2018.02); *B60W 2556/65* (2020.02)

(58) Field of Classification Search
CPC .............. B60W 60/001; B60W 40/12; B60W 2556/65; H04W 4/46
USPC .......................................................... 701/23
See application file for complete search history.

(56) References Cited

U.S. PATENT DOCUMENTS

| 8,755,998 B2 | 6/2014 | Braennstroem | |
| 8,762,043 B2 * | 6/2014 | Eidehall | B62D 15/0265 |
| | | | 701/302 |

| 9,159,231 B2 | 10/2015 | Noh | |
| 11,015,942 B1 | 5/2021 | Konrardy | |
| 11,099,583 B2 * | 8/2021 | Kubie | G08G 1/0129 |
| 11,395,218 B2 | 7/2022 | Lopes | |
| 11,656,093 B2 * | 5/2023 | Pan | G01C 21/3629 |
| | | | 701/24 |
| 2010/0194593 A1 | 8/2010 | Mays | |
| 2019/0009713 A1 * | 1/2019 | Pal | G08G 1/149 |
| 2019/0010735 A1 * | 1/2019 | Kanematsu | E05B 77/24 |
| 2019/0225213 A1 * | 7/2019 | Heinecke | B60W 30/0956 |

(Continued)

FOREIGN PATENT DOCUMENTS

| CN | 105781275 A * | 7/2016 | ............. E05B 81/64 |

OTHER PUBLICATIONS

"Automotive—Research, reports, and insights", IBM Institute for Business Value, downloaded from the Internet on Aug. 11, 2023, 7 pages, <https://www.ibm.com/thought-leadership/institute-business-value/en-us/industry/automotive>.

(Continued)

*Primary Examiner* — Jelani A Smith
*Assistant Examiner* — George A Alcorn, III
(74) *Attorney, Agent, or Firm* — Kelsey M. Skodje

(57) ABSTRACT

The present inventive concept provides for a method of autonomous driving road space reservation and adaption. The method includes determining a target location of a first vehicle. Road space is reserved for the first vehicle at the target location. The reserved road space of the first vehicle is communicated to a second vehicle, and the driving plan of the second vehicle is adapted based on the communicated reserved road space of the first vehicle automatically before arrival.

20 Claims, 3 Drawing Sheets

(56) References Cited

U.S. PATENT DOCUMENTS

2020/0104965 A1* 4/2020 Ramot ................... G08G 1/202
2022/0048513 A1* 2/2022 Xu .................. B60W 30/18163
2022/0126880 A1 4/2022 Kuemmel
2022/0343760 A1* 10/2022 Baek ..................... G08G 1/162
2022/0363254 A1* 11/2022 Baek ................ B60W 30/0956

OTHER PUBLICATIONS

"Automotive 2030: Racing toward a digital future", IBM Institute for Business Value, downloaded from the Internet on Aug. 11, 2023, 8 pages, <https://www.ibm.com/thought-leadership/institute-business-value/report/auto-2030>.
"Automotive industry IT solutions", IBM, downloaded from the Internet on Aug. 11, 2023, 6 pages, <https://www.ibm.com/industries/automotive>.

* cited by examiner

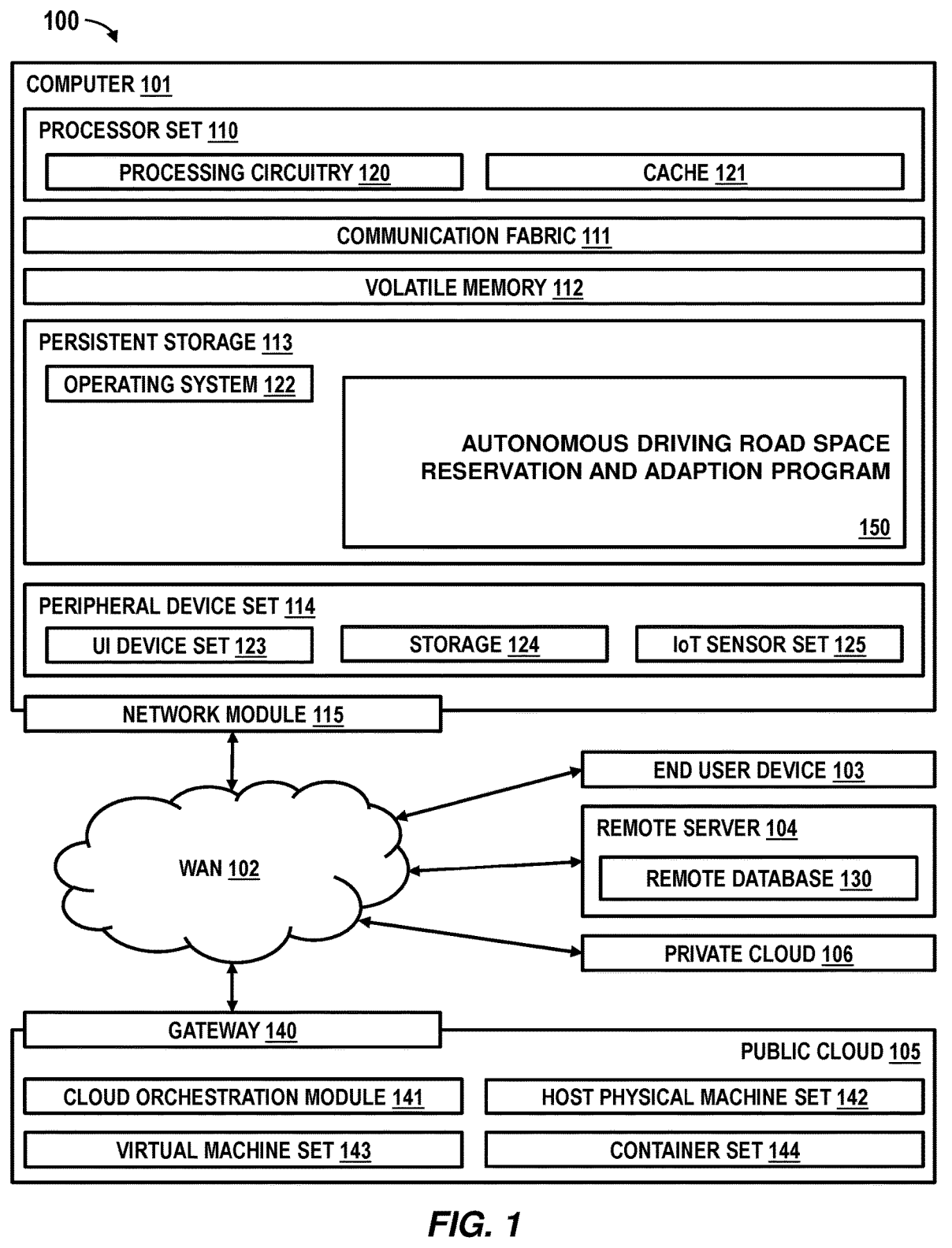

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

AUTONOMOUS DRIVING ROAD SPACE RESERVATION AND ADAPTION PROGRAM

150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

*FIG. 1*

Figure 2:
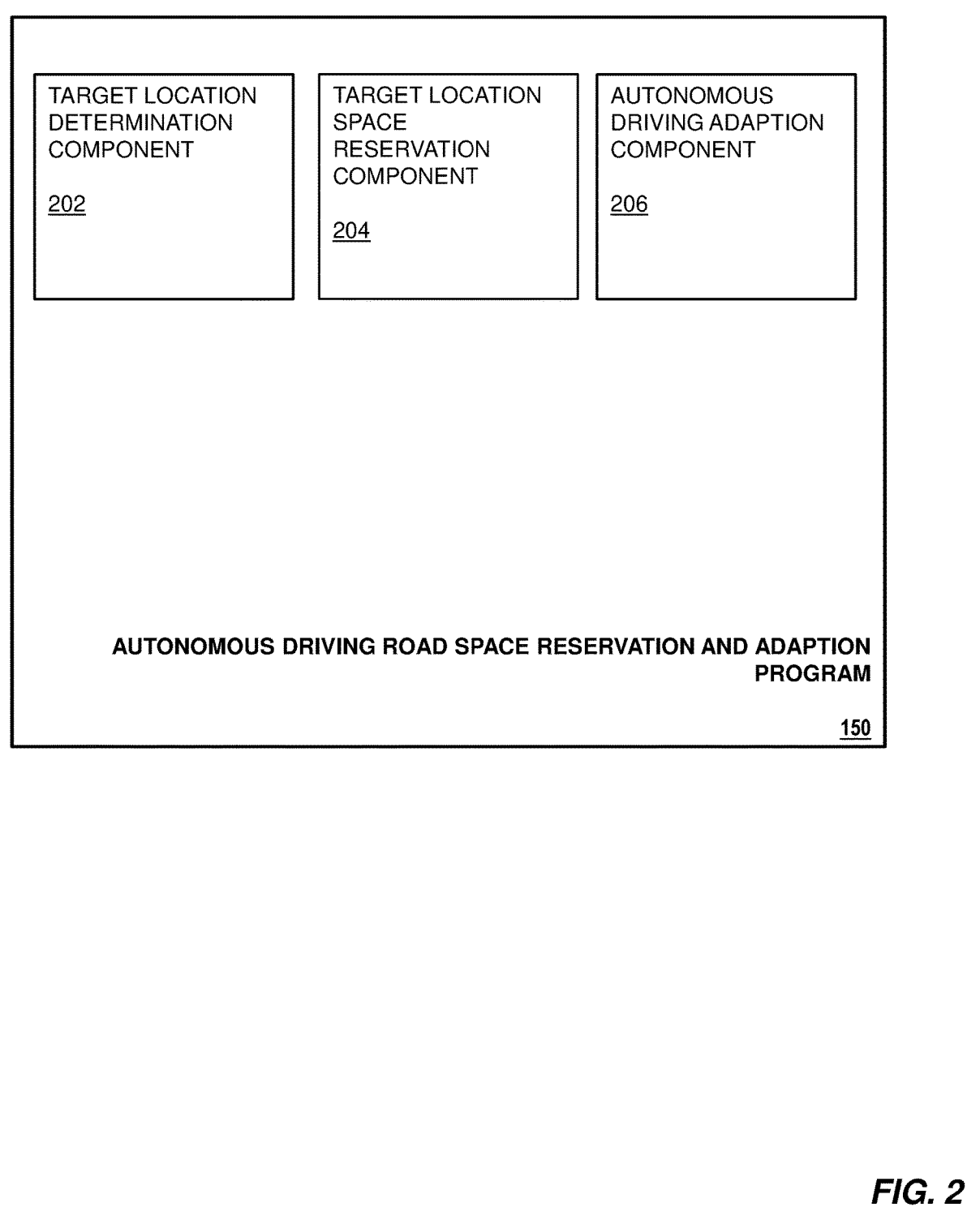

TARGET LOCATION
DETERMINATION
COMPONENT

202

TARGET LOCATION
SPACE
RESERVATION
COMPONENT

204

AUTONOMOUS
DRIVING ADAPTION
COMPONENT

206

**AUTONOMOUS DRIVING ROAD SPACE RESERVATION AND ADAPTION
PROGRAM**

DETERMINING A TARGET LOCATION OF A
FIRST VEHICLE

302

RESERVING ROAD SPACE FOR THE FIRST
VEHICLE AT THE TARGET LOCATION

304

COMMUNICATING THE RESERVED ROADSPACE
OF THE FIRST VEHICLE TO A SECOND VEHICLE

306

ADAPTING A DRIVING PLAN OF THE FIRST
AND/OR SECOND VEHICLE BASED ON THE
RESERVED ROAD SPACE

308

AUTONOMOUS DRIVING ROAD SPACE RESERVATION AND ADAPTION

BACKGROUND

Exemplary embodiments of the present inventive concept relate to autonomous driving, and more particularly, to autonomous driving road space reservation and adaption.

A common cause of vehicle (e.g., car) accidents is when a leading vehicle makes an abrupt stop (planned or emergent) and/or open its doors ahead of an approaching vehicle. An approaching vehicle may collide with the leading vehicle; make an unsafe lane change; and/or abruptly stop, causing an accident and/or whiplash to occupants. Even when a leading vehicle pulls over, inadequate notice and/or distance relative to the road can still create safety perils for an approaching vehicle.

Semi-autonomous vehicles are presently available with fully autonomous vehicles imminently forthcoming. Among the motivations for the invention of autonomous vehicles (e.g., a car) is safer vehicle operation by mitigating human error and/or inattention associated with driving. An autonomous driving vehicle can sense its environment (e.g., nearby vehicles and states thereof) and operate without necessary human input. An autonomous vehicle relies on sensors, actuators, complex algorithms, machine learning systems, and processors to create a map and detect its environment based on sensors located in various corresponding vehicle parts. For example, an autonomous vehicle is typically programmed to stop when another vehicle (autonomous or manually driven) detected in its vicinity abruptly stops and/or opens its doors, regardless of whether the detected vehicle is pulled over. This scenario can persist to cause safety issues, such as: an accident with other nearby vehicles; whiplash to vehicle occupants; and/or an inability to open an autonomous vehicle's doors.

SUMMARY

Exemplary embodiments of the present inventive concept relate to a method, a computer program product, and a system for autonomous driving adaption and road space reservation.

According to an exemplary embodiment of the present inventive concept, a method of autonomous driving road space reservation and adaption is provided. The method includes determining a target location of a first vehicle. Road space is reserved for the first vehicle at the target location. The reserved road space of the first vehicle is communicated to a second vehicle, and the driving plan of the second vehicle is adapted based on the communicated reserved road space of the first vehicle automatically before arrival.

According to an exemplary embodiment of the present inventive concept, a computer program product (CPP) for autonomous driving road space reservation and adaption is provided. The CPP includes one or more computer-readable storage media and program instructions stored on the one or more non-transitory computer-readable storage media capable of performing a method. The method includes determining a target location of a first vehicle. Road space is reserved for the first vehicle at the target location. The reserved road space of the first vehicle is communicated to a second vehicle, and the driving plan of the second vehicle is adapted based on the communicated reserved road space of the first vehicle automatically before arrival.

According to an exemplary embodiment of the present inventive concept, a computer system (CS) for autonomous driving road space reservation and adaption is provided. The CS includes one or more computer processors, one or more computer-readable storage media, and program instructions stored on the one or more of the computer-readable storage media for execution by at least one of the one or more processors capable of performing a method. The method includes determining a target location of a first vehicle. Road space is reserved for the first vehicle at the target location. The reserved road space of the first vehicle is communicated to a second vehicle, and the driving plan of the second vehicle is adapted based on the communicated reserved road space of the first vehicle automatically before arrival.

Thus, road space can be reserved, communicated, and driving adaption can be performed accordingly to improve safety, particularly with respect to at least partially autonomous vehicles.

According to an exemplary embodiment of the present inventive concept, the reserved road space is greater than or equal to the dimensions of the first vehicle, and a scheduled time of the reserved road space is based on a dynamic estimated time of arrival to the target location.

According to an exemplary embodiment of the present inventive concept, the reserved road space includes a buffer zone the width of an open car door of the first vehicle.

According to an exemplary embodiment of the present inventive concept, the communicated reserved road space is transmitted to the second vehicle via V2X communication.

According to an exemplary embodiment of the present inventive concept, the adapted driving plan of the second vehicle includes autonomously changing a trajectory of the second vehicle to avoid the reserved road space before an automated braking feature distance is reached.

According to an exemplary embodiment of the present inventive concept, adapting a driving plan of the first vehicle based on the autonomously changed trajectory of the second vehicle. The adapted driving plan of the first vehicle includes overriding an autonomous door locking feature of the first vehicle despite sensor detection of the second vehicle in the vicinity.

According to an exemplary embodiment of the present inventive concept, the adapted driving plan of the second vehicle includes disabling an autonomous braking feature of the second vehicle when the reserved road space does not overlap a lane of travel.

BRIEF DESCRIPTION OF THE DRAWINGS

The following detailed description, given by way of example and not intended to limit the exemplary embodiments solely thereto, will best be appreciated in conjunction with the accompanying drawings, in which:

FIG. 1 illustrates a schematic diagram of computing environment 100 including an autonomous driving road space reservation and adaption program 150, in accordance with an exemplary embodiment of the present inventive concept.

FIG. 2 illustrates a block diagram of components included in the autonomous driving road space reservation and adaption program 150, in accordance with an exemplary embodiment of the present inventive concept.

Figure 3:
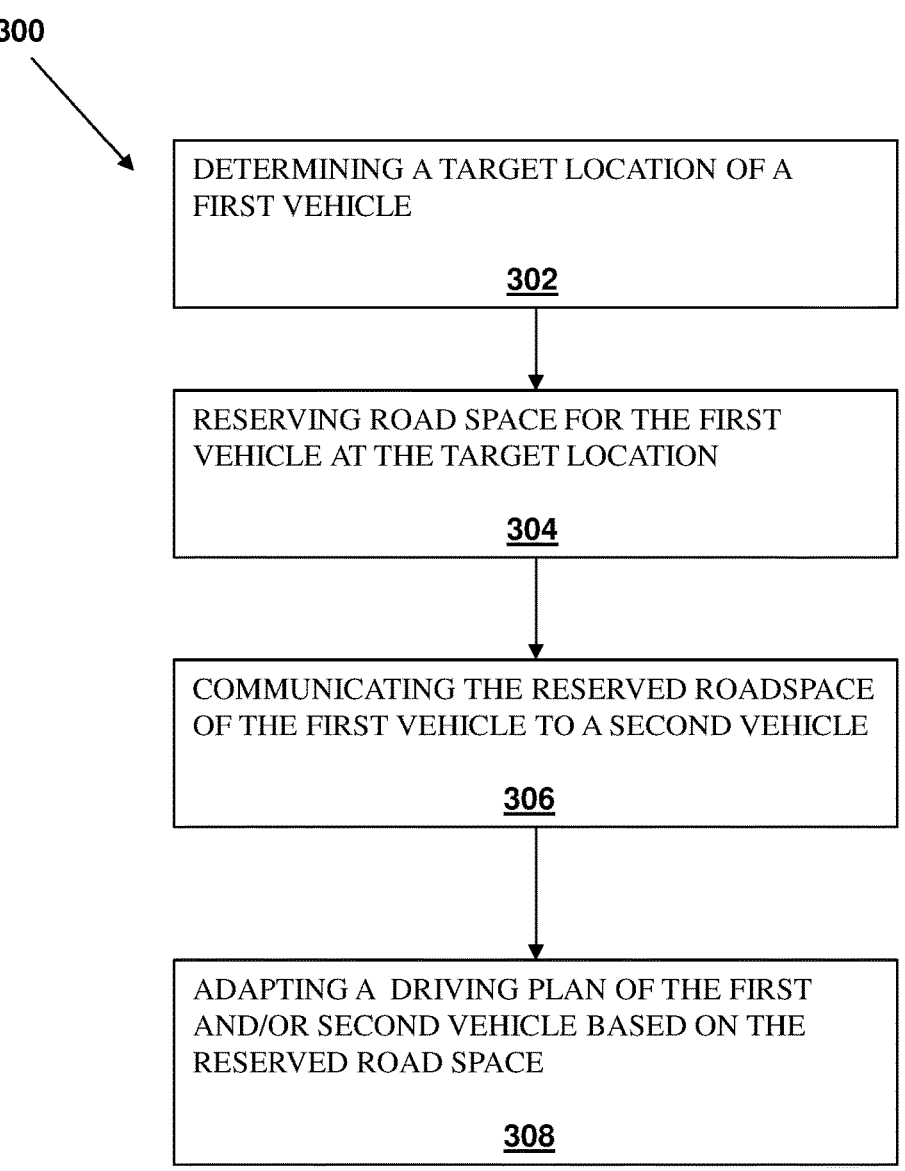
FIG. 3 illustrates a flowchart of a method of autonomous driving road space reservation and adaption 300, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

As described above, the driving of autonomous vehicles persists to encounter common vehicle accident causes, mainly due to inadequate notice to approaching vehicles and allocation of necessary space and time. The present inventive concept provides for autonomous driving road space adaption and reservation.

FIG. 1 illustrates a schematic diagram of computing environment 100 including the autonomous driving road space reservation and adaption program 150, in accordance with an exemplary embodiment of the present inventive concept.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time. A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the autonomous driving road space reservation and adaption program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates a block diagram of components included in the autonomous driving road space reservation and adaption program 150, in accordance with an exemplary embodiment of the present inventive concept.

The target location determination component 202 can analyze obtained context data and determine at least one real-time/potential/predetermined/predicted/suggested target location, estimated time of arrival (ETA), and/or target location action for at least one vehicle (e.g., first and or second vehicles). The target location can be determined by user input (e.g., selected location and/or location selection criteria (e.g., predetermined action duration/type/time/ETA, location type, emergent/non-emergent trip, etc.), proximity (e.g., radius) from a reference point (e.g., location, landmark, route, custom user selection, etc.)). The target location determination can be at least partially based on the analyzed obtained context data (e.g., ETA, target location action, safety considerations, etc.). The target location determination component 202 can additionally and/or alternatively revise, refine, predict, and/or suggest the target location of the at least one vehicle by obtaining and analyzing target location context data (e.g., extract features via applicable machine learning) and can select from among potential target locations, such as based on predetermined criteria/thresholds and context feature analysis (e.g., safety considerations, driver/vehicle actions, target location purpose/urgency, etc.) from various sources (e.g., sensors, digital maps, driving applications, network retrieval, satellite imaging, broadcast audio/video, traffic reports, weather reports, V2X communications, interface display notifications, driver/passenger smart device notifications, and/or other vehicles (e.g., within a predetermined distance of the at least one vehicle location, user input/potential target locations, routes, etc.)). The target location can be fixed or dynamic, and can include at least one of a bounded area, address, exit, destination (e.g., general area, landmark, GPS coordinates, grid units, pullover area, rest-stop, pickup/drop-off zone, vehicle/object, etc.), route (e.g., exit, lane, parking spot, segment, etc.), etc.). The vehicle can be autonomous and/or driver operable, and can include a car, motorcycle, boat, truck, fleet, plane, etc. The target location action can be performed by a vehicle and/or driver (e.g., law enforcement pursuit, pullover, stop, pickup/drop-off, first responder service, presentation to the emergency room, and/or an opening of vehicle parts (e.g., doors, trunk, hood, windows, flat bed, etc.)).

The vehicle can be connected to the autonomous road space reservation and adaptation program 150. The autonomous road space reservation and adaptation program 150 can be connected to a vehicle-to-everything (V2X) communication system, sensors, smart-devices, and/or a vehicle display interface. The sensors can be included in the at least one vehicle (e.g., front/rear/side/parking cameras, etc.); respective vehicle parts (e.g., doors, bumpers, steering column, trunk, hood, axles, brakes, wheels, engine, etc.); and/or various target location objects (e.g., light poles, barriers, traffic/highway signs, etc.).

The target location determination component 202 can extract context features, locations, magnitudes, quantities, and/or ETAs/dates/times thereof from the obtained driving context data via relevant machine learning analysis. The context features can include prior/real-time: location characteristics (e.g., vehicle locations, target locations, categorical designations (e.g., home, work, default, frequent, favorite, etc.), types (e.g., freeway, highway, road, paved/unpaved, lanes, exits, shoulder/pullover areas/parking spots, etc.), dimensions/shapes/angles of routes/segments, topography (e.g., grades, curvatures, terrain, elevations, etc.)), accidents/collisions, sunrise/sunset, light intensity, visibility, debris/hazards (e.g., obstructing vehicles and/or parts thereof, boulders, branches, trees, downed electrical wires, smoke, fires, spills, dangerous cargo, etc.), noise (e.g., car alarms, sirens, honking, etc.), sign information (e.g., speed limits, highway signs, exit signs, LED signs, etc.), traffic conditions (e.g., causes, closures, detours, lanes, durations, accidents/collisions, severities, etc.); construction conditions (e.g., types, detours, durations, etc.); weather conditions (e.g., dates/times, durations, rain, snow, fog, hail, wind, temperatures, intensities, etc.), speed limits/vehicle restrictions, etc.); vehicle driving quality characteristics (e.g., velocities, accelerations/decelerations, trajectories, orientations, safety feature warnings/engagements (e.g., turn signals, car alarms, anti-lock braking, collision detection, parking assistance, child locks, hazard signals, automatic braking, non-signaled lane departure resistance, etc.), steering stability, predetermined velocity differences relative to speed limits, momentums, etc.), etc.; vehicle characteristics (e.g., type (e.g., commercial, passenger, ride share service, first responder (e.g., police, fire department, ambulance, at least partially autonomous/driver operable, automatic/manual, make/model/year, 4WD, etc.), vehicle manufacturer recalls, service dates, safety issues (e.g., damage, engine temperatures, dashboard notifications, collisions/accidents, airbag deployments, vehicle part malfunctions, flat tires, etc.), vehicle type attributes (e.g., interior/exterior/part dimensions, masses, safety features, etc.); driver/passenger characteristics (e.g., driving restrictions, seat locations, volunteered prior medical history/conditions/impairments, learned/automated driving patterns, smart device notifications (e.g., arrythmia, blood sugar, heart attack, blood oxygen, heart rate, etc.)) etc.; received external notifications (e.g., V2X, interface display, digital map, first responder/types (e.g., law enforcement, fire department, medical service, ride sharing service, dispatch, emergency alert system messages, etc.)), etc.

The target location determination component 202 can refine, revise, predict, and/or suggest the target location, durations, ETA/date/time, optimal routes, and/or location actions based on the analyzed target location context features. The target location obtainment component 202 can verify availability, feasibility, and/or safety of target locations for target location actions by obtaining real-time context data (e.g., via local sensors, satellite imaging, digital maps, traffic conditions, weather conditions, etc.), extracted context features, and analysis thereof. The target locations, context features, and analysis thereof can be communicated via V2X communication and/or the interface display to the at least one vehicle and/or at least one other vehicle (e.g., predetermined distance/route/target location/trip purpose, etc.). In an embodiment, the target location determination component 202 can triage target locations (e.g., based on accident severity, damage, hazards/debris, medical emergencies, etc.).

For example, a consumer car (with two passengers in the right front and rear respectively) and a gasoline transport truck are travelling in the right lane on a highway. The gasoline transport initially has a predetermined target location as a nearby gas station. Each vehicle is equipped with the autonomous driving road space reservation and adaption program 150, which is connected to V2X communication and respective interface displays that include a digital map. The consumer car nearly misses their exit and abruptly decelerates and veers right. The gasoline transport truck does not have adequate time to brake and partially collides with a rear left bumper of the consumer car, causing the bumper to fall off. The driver of the consumer car subsequently suffers an arrythmia, which is detected by their smart watch that is connected to the V2X communication system. The target location determination component 202 determines the type of the gasoline transport truck and a potential hazard from the gasoline cargo. Local light pole sensors reveal that the gasoline transport truck is leaking gasoline but has too much momentum to make an immediate stop and due to oncoming car distances. The target location determination component 202 determines a revised target location as a truck rest stop ¼ mile ahead to stop, open doors, and address the leak/collision without compromising safety. The target location determination component 202 initially determines the target location for the consumer vehicle as a ditch adjacent to the exit because the driver is experiencing an arrythmia that can compromise their ability to drive safely. However, the target location determination component 202 determines from obtained topography that the ditch grade is too steep and rocky for safe access by first responders and/or vehicle exit. The target location determination component 202 suggests a more favorable target location as the more level exit shoulder 800 feet ahead. Upon arrival, the driver exits the vehicle. Local light pole sensors track his movement and eventual collapse another 400 feet ahead in the brush.

The target location space reservation component 204 can reserve determined target location space (e.g., road space) for the at least one vehicle and communicate with other vehicles and/or smart devices preemptively and/or in real-time. The target location space reservation component 204 can communicate the reserved target location space to the V2X communication system and/or the display interface of other vehicles (e.g., ambulances, law enforcement, other vehicles within a predetermined distance/route/target location/trip purpose/target location action, etc.), smart devices, and/or signs within a predetermined distance/route/target location (e.g., LED traffic signs and/or robots equipped with LED displays). The reserved target location space communication can include the extracted context features and/or analysis thereof, a duration, alternate routes/target locations/target locations actions, driving suggestions, and/or ETAs. The reserved target location space can be continuous/discontinuous and/or fixed/dynamic. The reserved target location space dimensions can be predetermined (e.g., based on at least the dimensions of the at least one vehicle, user input, default, and/or vehicle type (e.g., car, truck, van, make/model/year, etc.)), predicted, and/or suggested. The reserved target location space can include a precautionary buffer area that exceeds the at least one vehicle dimensions based on real-time/prior extracted and analyzed context features (e.g., other vehicle driving characteristics, medical emergency, target location actions, loose/damaged vehicle parts, debris/ hazards, etc.). In an embodiment, the target location space reservation component 204 can also communicate the reserved road space to other vehicles using audio broadcasts and/or via physical demarcation (e.g., using lights, holograms, obstruction/positioning, flares, chalk, cones, etc.), suggested driver/passenger actions, deployed robots, and/or collocated smart objects.

For example, a nearby ambulance (also equipped with the autonomous driving road space reservation and adaption program 150) receives dispatch messages and V2X notifications from the consumer vehicle and the gasoline transport vehicle via display interface. The target location space reservation component 204 of the ambulance prioritizes the consumer car and the driver's position as the target location (s) based on a calculated triage and receives an optimal route/ETA thereto. The target location space reservation component 204 determines and reserves a road space for the gasoline transport truck before arrival at the corresponding target location. The determined road space for the gasoline transport truck has a significant buffer area that encompasses an entire rest stop quadrant to account for potential ignition of the leaking gasoline. The target location space reservation component 204 mobilizes flight-capable robots to illuminate the reserved road space and display warning signs via equipped LEDs. The determined road space for the consumer car includes the vehicle dimensions, the open driver door, potential open passenger doors, the fallen bumper, and the area in which the driver collapsed. The target location space reservation component 204 diverts some light from V2X connected smart light poles to illuminate the reserved target location spaces. The target location space is reserved for the ambulance for 45 minutes and includes a determined optimal route, ambulance dimensions with open wagon/ front/side doors, and the entire shoulder and relevant lane of the exit. The target location space reservation component 204 contacts local law enforcement to establish a physical barrier to the exit lane and mobilized flight capable robots illuminate the collapsed driver and fallen bumper.

The autonomous driving adaption component 206 can adapt a driving plan of the at least one vehicle and/or other vehicles (e.g., ambulances, law enforcement, vehicles within a predetermined distance/route/target location/trip purpose/ target location action, etc.) based on the communicated and/or reserved road space. The adapted driving plan can be default/predetermined/scheduled/real-time/suggested/automated based on the communicated and/or reserved target location space and/or the extracted and analyzed target location context features (e.g., traffic, hazards/debris, collision/accident, etc.). The adapted driving plan can be fixed and/or dynamically updated based on real-time target location context features and analysis (e.g., target locations/ target location actions associated with the the at least one vehicle/driver/passenger and/or other vehicles, debris/hazards, traffic, etc.).

The adapted driving plan for an at least partially autonomous consumer vehicle can include changes to lanes/routes/ target locations/velocities/accelerations/trajectories/orientations, safety feature engagement/disengagement, braking, parking, closing vehicle parts; identifying manually driven other vehicles without V2X communication to prevent/ caution exit and/or vehicle part opening via V2X communication and/or interface display; preventing non-emergent stops; cutting ignition; turning on fog lights; and/or avoidance of detected hazards/debris for at least the determined duration. In the case of an at least partially autonomous first responder vehicle, the adapted driving plan can include autonomously routing the vehicle to the respective reserved road space and/or the triaged reserved road space of the at least one vehicle with an ETA within the predicted duration and/or best available (e.g., based on location, debris/hazards, and/or safety concerns, etc.), disabling vehicle safety features, opening vehicle parts on arrival, etc.

For example, the autonomous driving adaption component 206 automatically routes the partially autonomous gasoline transport truck to the reserved space in the rest stop area, parks, and cuts the ignition. The autonomous driving adaption component 206 routes autonomous oncoming consumer vehicles to avoid the exit, fallen bumper, highway lane with gasoline spillage. The autonomous driving adaption component 206 of the consumer vehicle detects an oncoming manually driven car that is not connected to the V2X communication system and is potentially unaware of the reserved road space and communications therefor. The autonomous driving adaption component 206 disables driving prevention with the open driver door, temporarily reverses into the initial potential target location in the ditch and cautions passengers not to exit the vehicle until the oncoming vehicle passes within 1 minute. The autonomous driving adaption component 206 routes the at least partially autonomous ambulance to the target location with an optimal route/ETA and schedules avoidance of the fallen bumper, gasoline spillage, and immediate opening of the wagon doors.

FIG. 3 illustrates a flowchart of the method of autonomous driving road space reservation and adaption 300, in accordance with an exemplary embodiment of the present inventive concept.

The autonomous driving road space reservation and adaption 300 can include steps for:

determining a target location of a first vehicle (step 302);

reserving road space for the first vehicle at the target location (step 304);

communicating the reserved road space of the first vehicle to a second vehicle (step 306); and adapting the driving plan of the second vehicle based on the communicated reserved road space of the first vehicle before arrival (step 308).

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

What is claimed is:

1. A method of autonomous driving road space reservation and adaption, the method comprising:

identifying potential target locations for a first vehicle in response to detecting an emergency event;

receiving sensor data from the first vehicle and the potential target locations;

extracting context features about the first vehicle and the potential target locations from the sensor data;

predicting, based at least on the context features, a target location action involving the first vehicle;

determining a buffer zone for the first vehicle based on the target location action;

selecting, from the potential target locations and based on the context features, the buffer zone, and the target location action, a target location for the first vehicle;

reserving road space that includes the buffer zone for the first vehicle at the target location;

autonomously routing the first vehicle to the reserved road space and disabling a safety feature within the reserved road space to enable the target location action;

communicating the reserved road space of the first vehicle to a second vehicle;

adapting a driving plan of the second vehicle based on the communicated reserved road space of the first vehicle automatically before arrival, wherein the adapting the driving plan comprises selecting a path that does not overlap with the reserved road space; and based on the adapted driving plan, autonomously changing a trajectory of the second vehicle according to the selected path and disabling an automated braking feature of the second vehicle.

2. The method of claim 1, wherein the reserving comprises scheduling a time for the reserved road space based on a dynamic estimated time of arrival at the target location.

3. The method of claim 1, wherein the buffer zone includes a width of an open car door of the first vehicle.

4. The method of claim 1, wherein the communicated reserved road space is transmitted to the second vehicle via V2X communication.

5. The method of claim 1, wherein the disabling the safety feature includes overriding an autonomous door locking feature of the first vehicle despite sensor detection of the second vehicle.

6. The method of claim 1, wherein the selecting the path comprises determining that the path does not overlap a lane of travel.

7. The method of claim 1, wherein the target location action includes opening a door of the first vehicle.

8. The method of claim 1, wherein the context features comprise an action to be taken by a driver of the first vehicle.

9. The method of claim 1, wherein the detecting the emergency event comprises detecting a medical emergency, a vehicle maintenance requirement, or an external hazard.

10. A computer program product (CPP) for autonomous driving road space reservation and adaption, the CPP comprising:

one or more computer-readable storage media and program instructions stored on the one or more computer-readable storage media capable of performing a method, the method comprising:

identifying potential target locations for a first vehicle in response to detecting an emergency event;

receiving sensor data from the first vehicle and the potential target locations;

extracting context features about the first vehicle and the potential target locations from the sensor data;

predicting, based at least on the context features, a target location action involving the first vehicle;

determining a buffer zone for the first vehicle based on the target location action;

selecting, from the potential target locations and based on the context features, the buffer zone, and the target location action, a target location for the first vehicle;

reserving road space that includes the buffer zone for the first vehicle at the target location;

autonomously routing the first vehicle to the reserved road space and disabling a safety feature within the reserved road space to enable the target location action;

communicating the reserved road space of the first vehicle to a second vehicle;

adapting a driving plan of the second vehicle based on the communicated reserved road space of the first vehicle automatically before arrival, wherein the adapting the driving plan comprises selecting a path that does not overlap with the reserved road space; and based on the adapted driving plan, autonomously changing a trajectory of the second vehicle according to the selected path and disabling an automated braking feature of the second vehicle.

11. The CPP of claim 10, wherein the reserving comprises scheduling a time for the reserved road space based on a dynamic estimated time of arrival to the target location.

12. The CPP of claim 10, wherein the buffer zone includes a width of an open car door of the first vehicle.

13. The CPP of claim 10, wherein the communicated reserved road space is transmitted to the second vehicle via V2X communication.

14. The CPP of claim 10, wherein the disabling the safety feature includes overriding an autonomous door locking feature of the first vehicle despite sensor detection of the second vehicle.

15. The CPP of claim 10, wherein the selecting the path comprises determining that the path does not overlap a lane of travel.

16. A computer system (CS) for autonomous driving road space reservation and adaption, the CS comprising:

one or more computer processors, one or more computer-readable storage media, and program instructions stored on the one or more of the computer-readable storage media for execution by at least one of the one or more processors capable of performing a method, the method comprising:

identifying potential target locations for a first vehicle in response to detecting an emergency event;

receiving sensor data from the first vehicle and the potential target locations;

extracting context features about the first vehicle and the potential target locations from the sensor data;

predicting, based at least on the context features, a target location action involving the first vehicle;

determining a buffer zone for the first vehicle based on the target location action;

selecting, from the potential target locations and based on the context features, the buffer zone, and the target location action, a target location for the first vehicle;

reserving road space that includes the buffer zone for the first vehicle at the target location;

autonomously routing the first vehicle to the reserved road space and disabling a safety feature within the reserved road space to enable the target location action;

communicating the reserved road space of the first vehicle to a second vehicle;

adapting a driving plan of the second vehicle based on the communicated reserved road space of the first vehicle automatically before arrival, wherein the adapting the driving plan comprises selecting a path that does not overlap with the reserved road space; and based on the adapted driving plan, autonomously changing a trajectory of the second vehicle according to the selected path and disabling an automated braking feature of the second vehicle.

17. The CS of claim 16, wherein the reserving comprises scheduling a time for the reserved road space based on a dynamic estimated time of arrival at the target location.

18. The CS of claim 16, wherein the buffer zone includes a width of an open car door of the first vehicle.

19. The CS of claim 16, wherein the communicated reserved road space is transmitted to the second vehicle via V2X communication.

20. The CS of claim 16, wherein the disabling the safety feature includes overriding an autonomous door locking feature of the first vehicle despite sensor detection of the second vehicle.

* * * * *